United States Patent [19]

Krogmann

[11] Patent Number: 5,222,065
[45] Date of Patent: Jun. 22, 1993

[54] DEVICE FOR GENERATING MEASURING SIGNALS WITH A PLURALITY OF REDUNDANTLY PROVIDED SENSORS

[75] Inventor: Uwe Krogmann, Überlingen-Nussdorf, Fed. Rep. of Germany

[73] Assignee: Bodenseewerk Geratetechnik GmbH, Uberlingen, Fed. Rep. of Germany

[21] Appl. No.: 594,085

[22] Filed: Oct. 9, 1990

[51] Int. Cl.$^5$ .............................................. G06F 11/00
[52] U.S. Cl. .................................... 371/19; 371/68.3; 371/11.3; 395/575
[58] Field of Search ...................... 371/19, 68.3, 11.3, 371/11.1; 395/575

[56] References Cited

U.S. PATENT DOCUMENTS

| | | | |
|---|---|---|---|
| 3,688,099 | 8/1972 | Buscher | 371/25.1 |
| 4,327,437 | 4/1982 | Gelderloos | 371/68.3 |
| 4,590,549 | 5/1986 | Burrage et al. | 364/131 |
| 4,622,667 | 11/1986 | Yount | 371/9.1 |
| 4,698,785 | 10/1987 | Desmond et al. | 364/900 |
| 4,982,366 | 1/1991 | Takemae | 365/195 |

FOREIGN PATENT DOCUMENTS

3037150  3/1984  Fed. Rep. of Germany .
640959  1/1984  Switzerland .

OTHER PUBLICATIONS

IBM Technical Disclosure Bulletin, "Advanced Test System (ATS) for Software Test", vol. 30, No. 9, Feb. 1988, pp. 134-137.

A paper by Fischler and Firschein-"A Fault Tolerant Multiprocessor Architecture for Real-Time Control Applications", Proceedings of the Annual Symposium on Computer Architecture, University of Florida, 9-11 Dec. 1973, New York.

Primary Examiner—Stephen M. Baker
Assistant Examiner—Ly V. Hua
Attorney, Agent, or Firm—Lee, Mann, Smith, McWilliams, Sweeney & Ohlson

[57] ABSTRACT

Measuring signals are derived from a plurality of redundantly provided sensors, the sensor signals of which are sampled and digitized at a predetermined rate, and are processed by computers also provided redundantly. Each of the computers processes the sensor signals with a main program and a monitoring program. A first computer is arranged to process in each computing cycle (n) sensor signals sampled in a predetermined sampling cycle (n), which is preferably identical with the computing cycle. Further computers are provided. Each of the further computers processes in each computing cycle n the sensor signals which have been sampled in sampling cycles (n−1), (n−2), (n−3), respectively, which lead the computing cycle by predetermined time intervals. A fault logic serves to make decisions on program faults from the output data obtained with the main program and the monitoring program in the various computing cycles.

9 Claims, 4 Drawing Sheets

| $\Delta P_n$ | $\bar{p}^{NN}$ | $\bar{p}^{NM}$ | $\bar{p}^{MN}$ | $\bar{p}^{MM}$ | OUTPUT STATES | | |
|---|---|---|---|---|---|---|---|
| | | | | | $N_n$ | $M_n$ | FAIL |
| 0 | 0 | 0 | 0 | 0 | 1 | 1 | 0 |
| 1 | 1 | 1 | 0 | 0 | 0 | 1 | 0 |
| 1 | 0 | 0 | 1 | 1 | 1 | 0 | 0 |
| 1 | 1 | 1 | 1 | 1 | 0 | 0 | 1 |
| ALL OTHER POSSIBLE STATES | | | | | 0 | 0 | 1 |

1 ≙ VALID
0 ≙ INVALID

DEVICE FOR GENERATING MEASURING SIGNALS WITH A PLURALITY OF REDUNDANTLY PROVIDED SENSORS

TECHNICAL FIELD

The invention relates to a device for generating measuring signals with a plurality of redundantly provided sensors, the sensor signals of which are sampled and digitized at a predetermined cycle rate and are processed by computers, which are also redundantly provided and operated with multiply provided software.

BACKGROUND ART

With some automatic control systems, for example autopilots or automatic control systems in nuclear power plants, the failure of a sensor or of a signal processing computer may have severe consequences. In such cases, it is required that the automatic control remains operative even after failure of one or more components. Inoperativeness after failures of a plurality of components has, at least, to be indicated by a failure message. The automatic control system or some other measuring and signal processing installation is to be "fault-tolerant".

As far as the failure or an intolerable deterioration of the "hardware" is concerned, this fault-tolerance is achieved by providing the sensors and the signal processing computers multiply redundantly. An appropriate "redundancy management" then takes care of defective components being recognized and being eliminated for the forming of the measuring signal. In the simplest case, for example, when one and the same measured quantity is measured by three sensors, redundancy management can consist in voting monitoring: If of the two measured values two measured values are identical within predetermined tolerances, and the third measured value clearly deviates from the mean of the other two, it can be assumed that the third sensor is defective.

Signal processing, however, does not only rely on the hardware but also on the "software", i.e. the programming of the signal processing computers. Also the software can exhibit faults. There is, however, a basic difference between hardware failures and software faults. Hardware failures, i.e. the becoming inoperative of a component, occur statistically. It cannot be predicted, whether or when a component will fail. Usually the failure probability is an exponential function of time. By providing components redundantly and redundancy management an increased safety can be achieved. Software is not subjected to wear. Faults are latently contained in the software from the beginning. They become apparent, however, only with certain combinations of input quantities and internal states. Redundancy of software is of no use: If input signals are processed by the same software in three different channels, the faults will appear simultaneously in all three channels.

It is virtually impossible to test software for all imaginable combinations of input signals and internal states. Such a test would require intolerably long time even with the fastest computers.

In order to recognize software faults in critical systems such as flight controllers and autopilots, according to the prior art, programs for carrying out a particular signal processing are programmed multiply by different programmers in different program languages. Then the signal processing is carried out once with a first program, once with a second program, and, if necessary, also with a third program. It is improbable that under these circumstances a programming error occurs in all three or more programs at the same time. These different programs for carrying out the same signal processing are called "dissimilar software". An architecture operating with three or more dissimilar programs is described in a paper by Fischler and Firschein "A Fault Tolerant Multiprocessor Architecture for Real-Time Control Applications" in "Proceedings of the Annual Symposium on Computer Architecture", University of Florida, Dec. 2 to 11, 1973, New York, 115-157.

This multiple programming is very expensive. This is true in particular, if the system is to tolerate a plurality of occurring faults corresponding to, for example, a safety standard of "fail-operational, fail-operational, fail-safe".

Another solution is the installation of two sets of dissimilar software in each of a plurality of channels, the pairs of software sets used for the various channels being again identical. Then only two programs have to be created. In each channel, however, one set of software is monitored by just one second set of software incorporated in the channel. The redundancy of the channels does not result in additional safety, as software faults, as explained above, appear simultaneously in all channels. Thus, as far as the software is concerned, there is, now as before, only a twofold redundancy.

Swiss patent 640,959 and German patent 3,037,150 disclose a data processing system with three channels, wherein input data are processed in three parallel computers in accordance with one program. The computers work with relative time shift with identical data, i.e. the same program step is carried out by the various computers at different times. After a certain control section, the results are stored temporarily. When all results are available in the intermediate memory, there will be a voting monitoring step to eliminate mutilated results. Thereby the computing operation continues, even if one result has to wait for the other in the intermediate memory.

This time-shifted operation of programs permits elimination of outside disturbances. Such outside disturbance, for example a voltage spike, will occur at different program steps in the different programs. If the result is thereby falsified, this can be detected by the voting monitoring. If the programs ran time-parallel, such an outside disturbance could affect all three programs in the same way and would not be recognized by the voting monitoring. If, however, there is a fault in the program, this fault will made, with time shift, in all three computers with the same input data. The intermediate memory would receive, with time shift, three wrong results. After receipt of the last one of these wrong results, these results would be identified as "correct" by the voting monitoring step.

DISCLOSURE OF THE INVENTION

It is the object of the invention to achieve a high degree of fault tolerance of the software of a device defined in the beginning, with a minimum of programming effort.

According to the invention this object is achieved in that (a) each of the computers (34,36,38,40) processes the sensor signals with a main program (N) and, in parallel thereto, with a monitoring program (M) different from the main program (N), (b) a first one of said computers (34) is arranged to process, in each computing cycle (n), sensor signals which have been sampled in a predetermined sampling cycle (n) referenced to said computing cycle (n), (c) further ones of said computers (36,38,40) are arranged to process, in each computing cycle (n), sensor signals which have been sampled in sampling cycles ((n−1), (n−2), (n−3)) which have different lead relative to said predetermined sampling cycle, and (d) a fault logic (FIG. 2) is provided to make decisions on program faults based on the results obtained with the main program (N) and the monitoring program (M) in the various computing cycles.

Software faults are initiated by certain sets of input data in combination with a particular internal state. The invention avoids the occurrence of identical sets of input data at the various computers by providing a "separation in time": The further computers process input data from sensor signals which lead the set of input data processed by the first computer in time by different, for example one or two, sampling cycles. This prevents the application of identical input data to all computers and ensures that the computers are never all in the same state.

If the main program is operative in the predetermined sampling and computing cycle, thus, for example, at the time nT, T being the cycle period, then the program will work also in the further computers. When these computers process the input data derived from the sensor data, for example, from the times $(n-1)T$, $(n-2)T$ and $(n-3)T$, then these input data have been processed in the preceding computing cycles by the first computer. Therefore, if the main program works well at the time nT, or—in other words—$N_n$ operates correctly, N designating the main program, then also $N_{n-1}$, $N_{n-2}$, etc., operate correctly.

The monitoring program, which is to be designated by the symbol M, checks, whether the main program operates correctly at the time nT, i.e. with the sensor signals sampled in the sampling cycle. In the simplest case, this can be assumed, if, at the time nT, both programs $N_n$ and $M_n$ provide identical results.

The further computers provide the measuring signals to be derived from the sensor signals with tested software.

Preferably, the fault logic once provides the difference of the output data obtained as results from the processing of the input data by means of the first computer, with the main program and with the monitoring program. Thereby, the consistency of the results obtained with the main program and with the monitoring program. If a significant difference occurs, the fault logic compares the results obtained with the main program and with the monitoring program from the first computer with predicted values which are calculated from the results obtained from the further computers with the main program and with the monitoring program. From the values of the computed measured quantity in the sampling cycles $(n-3)$, $(n-2)$ and $(n-1)$, which are computed by the further computers, the value of the measured quantity at the time nT can be estimated by extrapolation. It can be assumed that a physical measured quantity will vary continuously and differentiably. Then a test can be made which of the computed values, that computed with the main program, that computed with the monitoring program or both, deviates from such a predicted value. This permits conclusions as to the status of the software.

Modifications of the invention are subject matter of further dependent claims.

An embodiment of the invention is described hereinbelow with reference to the accompanying drawings.

PREFERRED EMBODIMENT OF THE INVENTION

Figure 1:
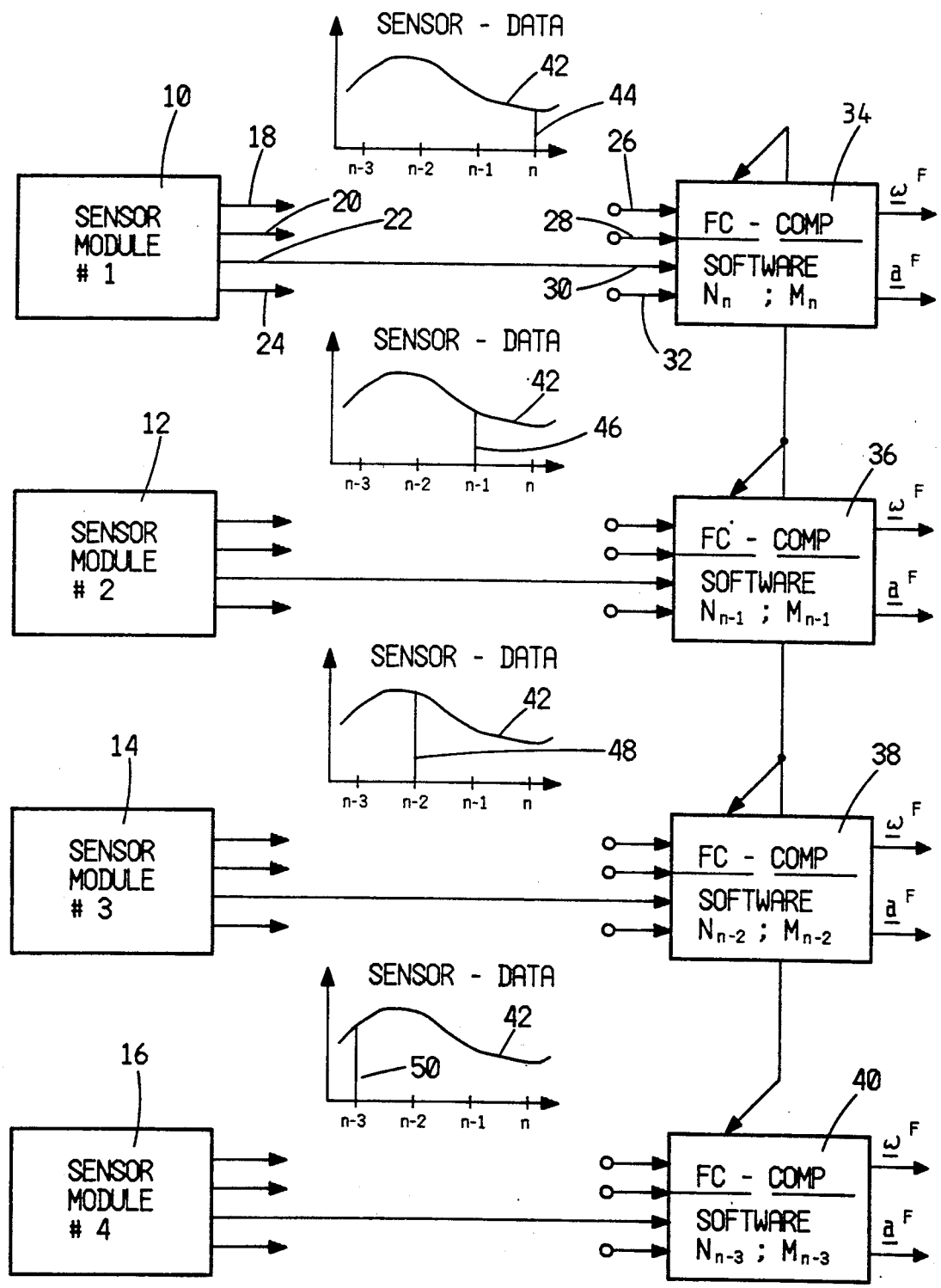
FIG. 1 shows, as a block diagram, the structure of a device for generating measuring signals from a plurality of redundantly provided sensors or sensor modules with a plurality of computers, each of which carries out a signal processing with two sets of different software.

FIG. 1 illustrates, as an example of the generation of measuring signals from sensor signals, the signal processing of gyro and accelerometer signals to generate angular rate and acceleration signals in a flight control system, the angular rate signals and acceleration signals being referenced to an aircraft-fixed reference system. Numerals 10, 12, 14 and 16 designate four sensor modules. Each of the sensor modules provides four gyro and accelerometer signals at four outputs 18, 20, 22 and 24. Each of the four outputs 18, 20, 22, and 24 of each sensor module 10, 12, 14 and 16 is connected to an associated input 26, 28, 30 and 32, respectively, of a computer. A first computer 34 is associated with the sensor module 10. A second computer 36 is associated with the sensor module 12. A third computer 38 is associated with the sensor module 14. A fourth computer 40 is associated with the sensor module 16. For clarity, only the connection of the output 22 of each sensor module with the input 30 of the associated computer is illustrated in FIG. 1. Each of the computers 34, 36, 38 and 40 causes a signal processing of the sensor signals such that an angular rate vector $\omega^F$ referenced to an aircraft-fixed reference system and an acceleration vector $a^F$ also referenced to an aircraft-fixed reference system are obtained.

This signal processing is effected once by means of a main program, which is designated by N, and once by means of a monitoring program, which is designated by M. This is the software of the computer. In a particular computing cycle "n", thus at the time nT, if T is the cycle period, both programs of the first computer 34 process the input data which result from the sampling and digitizing of the sensor signals at the time nt, thus in the sampling cycle "n". This is symbolized in FIG. 1 by characterizing the programs by the index n. Thus the programs are designated by $N_n$ and $M_n$. Numeral 42 in FIG. 1 designates the waveform of a sensor signal. This sensor signal is an analog signal and is provided by all sensor modules 10, 12, 14 and 16 at their outputs 22. In the first computer 34, the sensor signals in the sampling cycle "n" are processed as input data. This sampling cycle coincides with the computing cycle. This is illustrated in FIG. 1 at 44.

The second computer 36 is operated with the same programs N and M. In the second computer 36, however, in the computing cycle "n" the sensor signals processed are those which have been sampled and digitized in the first preceding cycle. This is illustrated in FIG. 1 at 46: The sensor signal processed in the computing cycle "n" has been sampled in the sampling cycle "n−1". This way of signal processing is symbolized by designating the programs for the computer 36 by $N_{n-1}$ and $M_{n-1}$. The second computer also provides output data $\omega^F$ and $a^F$. Though these output data are associated with the state at the time (n−1)T, thus one cycle ago, this does not matter in practice because of the high cycle rate.

Correspondingly, the third computer 38 is operated with the programs N and M. In the third computer, the sensor signals sampled and digitized two cycles ago are processed in the computing cycle "n". This is illustrated in FIG. 1 at 48. The sensor signal processed in the computing cycle "n" is sampled in the sampling cycle "n−2". This way of signal processing is again symbolized by designating the programs for the computer 38 by $N_{n-2}$ and $M_{n-2}$. Also the third computer 38 provides output data $\omega^F$ and $a^F$. These output data correspond to the time (n−2)T, thus two cycles ago. Also this delay does not matter.

The fourth computer 40 is operated with the programs N and M. In the fourth computer 40, the sensor signals sampled and digitized three cycles ago are processed in the computing cycle "n". This is illustrated in FIG. 1 at 50. The sensor signal processed in the computing cycle "n" is sampled in the sampling cycle "n−3". This way of signal processing is again symbolized by designating the programs for the computer 40 by $N_{n-3}$ and $M_{n-3}$. Also the fourth computer 40 provides output data $\omega^F$ and $a^F$. These output data correspond to the state at the time (n−3)T, thus three cycles ago. Also this delay does not matter.

Figure 2:
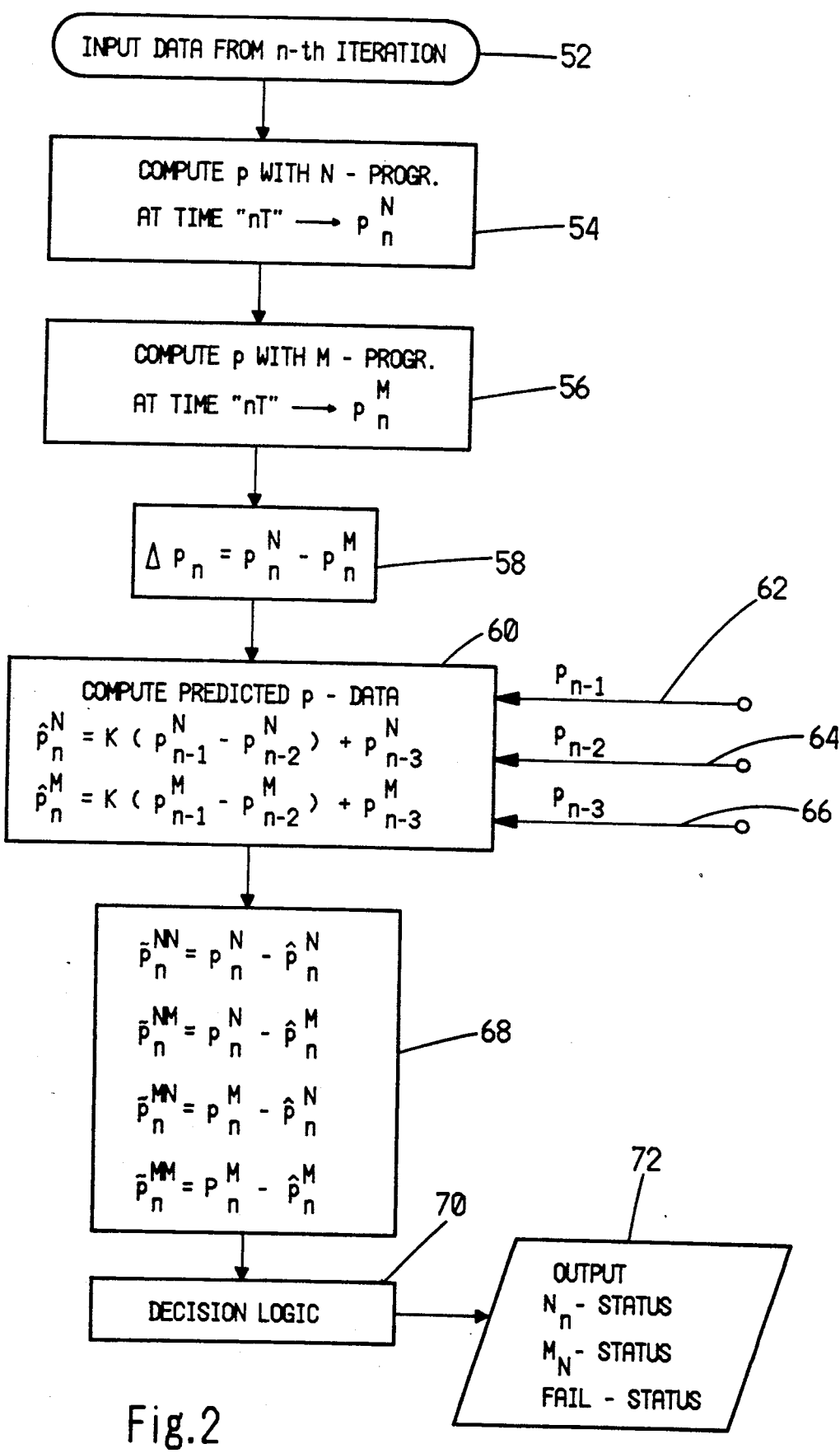
FIG. 2 shows a fault logic for determining the software status, i.e. for detecting software faults, in a device of FIG. 1.

FIG. 2 illustrates the operation of the fault logic with reference to a quantity "p", which represents a component of the angular rate vector $\omega^F$. This component is one of the output data of the computers 34, 36, 38 and 40. The indices n, n−1 and n−3 characterize the sensor signals used to compute the output data. Thus the index "n−2" indicates that the value of p characterized thereby has been computed using the sensor signals at the time (n−2)T, thus two cycles before the computing cycle. The superscripted index indicates the program by means of which the respective value of p was computed. Thus $p_{n-1}^M$ designates the value of p which has been computed by means of the monitoring program M on the basis of the sensor signals sampled one cycle before the computing cycle.

The first computer serves only to monitor the programs in the manner to be described hereinbelow. The further computers, namely the second computer 36, the third computer 38 and the fourth computer 40 provide the output data for a flight control. If the first computer works unobjectionably with the main program N and the monitoring program M, then also the further computers 36, 38 and 40 will work unobjectionably with these programs. Actually these programs work with sets of input data which have already been applied to the first computer 34 during the preceding computing cycles n−1, n−2 and n−1, and (supposed at first) have been processed unobjectionably. Therefore, the fault logic illustrated in FIG. 2 at first tests the unobjectionable operation of the computer 34 with the two programs $N_n$ and $M_n$, thus with the most recent sensor signals sampled synchronously with the computing cycle.

A predicted value for the output data in the n-th computing cycle can be derived from the output data of the three further computers 36, 38 and 40 by polynomial extrapolation. A predicted value can also be obtained by adaptive Kalman prediction. These predicted values may be applied to the flight control system.

In order to test the software, at first the values of the sensor signals sampled in the n-th sampling cycle are input into the first computer 34. This is illustrated by the oval 52. From these data the computer 32 computes the output data with the main program $N_n$ at the time "nT", as symbolized by block 54. This results in a value $p_n^N$ of the component p of the angular rate vector. In similar way, the computer 34 computes the value of the component p of the angular rate vector from the sensor signals at the time nT with the monitoring program $M_n$, as symbolized by block 56. This results in the value $p_n$.

The difference $\Delta p_n$ of the two values computed with the main program and with the monitoring program:

$$\Delta p_n = p_n^N - p_n^M \tag{1}$$

is formed. This is illustrated by block 58. Furthermore, predicted values for the quantity p are computed in accordance with the relations $$\hat{p}_n^N = K(p_{n-1}^N - p_{n-2}^N) + p_{n-3}^N \tag{2}$$

$$\hat{p}_n^M = K(p_{n-1}^M - p_{n-2}^M) + p_{n-3}^M. \tag{3}$$

Therein K is a constant. The equations (2) and (3) represent a poynomial extrapolation. Instead, also an adaptive Kalman prediction can be used. These predicted values serve as reference values for the output data of the computer 34 actually computed during the n-th computing cycle. The idea is that physical quantities of the type present here do not change in steps. Therefore, the output data of the computer 34 in the computing cycles n−3, n−2 and n−1 permit an at least approximate prediction, which output data of the computer 34 are to be expected with the n-th computing cycle. If these output data deviate substantially from the predicted value, a fault of the program has to be assumed.

The forming of the predicted values is represented by block 60 in FIG. 2. The values $p_{n-1}$, $p_{n-2}$ and $p_{n-3}$ have been computed and stored by the computer in the preceding computing cycles. This is illustrated in FIG. 2 by the inputs 62, 64 and 66 to block 60.

The next step of the fault logic is a comparison of the output values $p_n^N$ and $p_n^M$ computed with the main program N or the monitoring program M with the predicted values $\hat{p}_n^N$ and $\hat{p}_n^M$ which have been formed from the output data computed with the main program N or the monitoring program M, respectively. Thus the following differences are formed:

$$\tilde{p}_n^{NN} = p_n^N - \hat{p}_n^N \tag{4}$$

$$\tilde{p}_n^{NM} = p_n^N - \hat{p}_n^M \tag{5}$$

$$\tilde{p}_n^{MN} = p_n^M - \hat{p}_n^N \tag{6}$$

$$\tilde{p}_n^{MM} = p_n^M - \hat{p}_n^M. \tag{7}$$

This is illustrated by block 68. The difference $\Delta p_n$ formed in accordance with equations (4) to (7) as represented by block 68 are applied to a decision logic 70. The decision logic provides as outputs the status of the main program N in the n-th computing cycle ($N_n$) and the status of the monitoring program M in the n-th computing cycle ($M_n$) and a fault message. This is illustrated by a parallelogram 72 in FIG. 2.

Figures 3, 4:
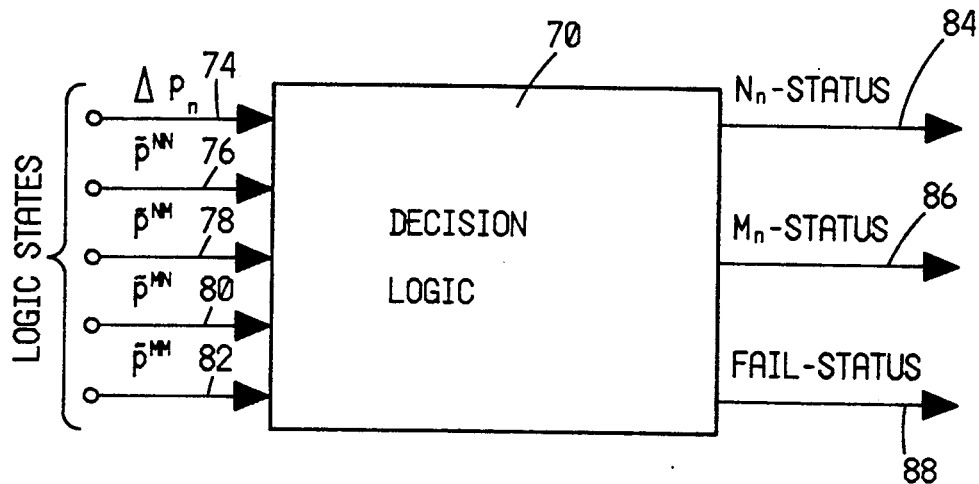
FIG. 3 shows a decision logic, which is used in the fault logic of FIG. 2 for the determination of the software status.
FIG. 4 shows the associated truth table.

The decision logic 70 is separately illustrated in FIG. 3. The decision logic 70 receives the differences according to equations (1) and (4) to (7) at "inputs" 74, 76, 78, 80 and 82. The decision logic provides the status of the main program at an "output" 84, the status of the monitoring program at an output 86 and a fault message at an output 88. The status of the main program $N_n$ or the status of the monitoring program $M_n$ indicate whether the main program or the monitoring program works well in the n-th computing cycle. This is assumed, if both programs provide the same result and each result is identical with the two predicted values.

FIG. 4 shows a truth table of the decision logic. Of the input states, "0" means that the respective difference is not present. The input state "1" indicates that a difference, thus a deviation of the respective computed output data, occurs. Of the output states of the decision logic 70, a "1" indicates in the case of a program the unobjectionable functioning of the program. In the case of the fault message, "1" means the occurrence of the fault message.

If $\Delta p_n = 0$, thus the results obtained with the two programs are identical, and if these results are also identical with all predicted values, then both programs $N_n$ and $M_n$ are operative in the n-th computing cycle. There is no fault signal. If, however, a $\Delta p_n$ is present, then either the main program or the monitoring program may exhibit a fault. Which of the programs exhibits the fault can be gathered from the comparison with the predicted values.

In the second line of FIG. 4, the first column is "1"i.e. the output data of the main program and those of the monitoring program deviate from each other (equation (1)). It has now to be decided, which of the two programs exhibits the fault. It will be noticed that $p_n^N$, the value of p computed with the main program, deviates both from the predicted value formed by means of the main program and from the predicted value formed by means of the monitoring program, while such deviations do not occur with the value of p computed by means of the monitoring program. It can be concluded therefrom that a fault in the main program $N_n$ has occurred in the n-th computing cycle with the sensor data then applied to the first computer 34. The output state of the decision logic 70 at the output 84 ($N_n$-status) is logic "0", the output state at the output 86 ($M_n$-status) is logic "1". There is no need to provide a fault signal at output 88, as the computers can continue to work with one single program.

In the third line of the truth table, the parts of main and monitoring programs are interchanged.

In the fourth line of the truth table all input states at the inputs 74 to 82 are logic "1". There are deviations between all output data $p_n^N$ and $p_n^M$ and all predicted values as well as between the output data themselves. In this case, a fault occurs with both programs in the n-th computing cycle. A state of logic "0" appears at both outputs 84 and 86. A state of logic "1", thus a fault message, appears at output 88. The same happens with all other imaginable input states.

If a software fault occurs in one of the programs only and is recognized and localized in the manner described, all further computers, which provide the control signals for the flight control system threefold redundantly are switched over to the respective other program. The system is then still fully operative.

Figure 5:
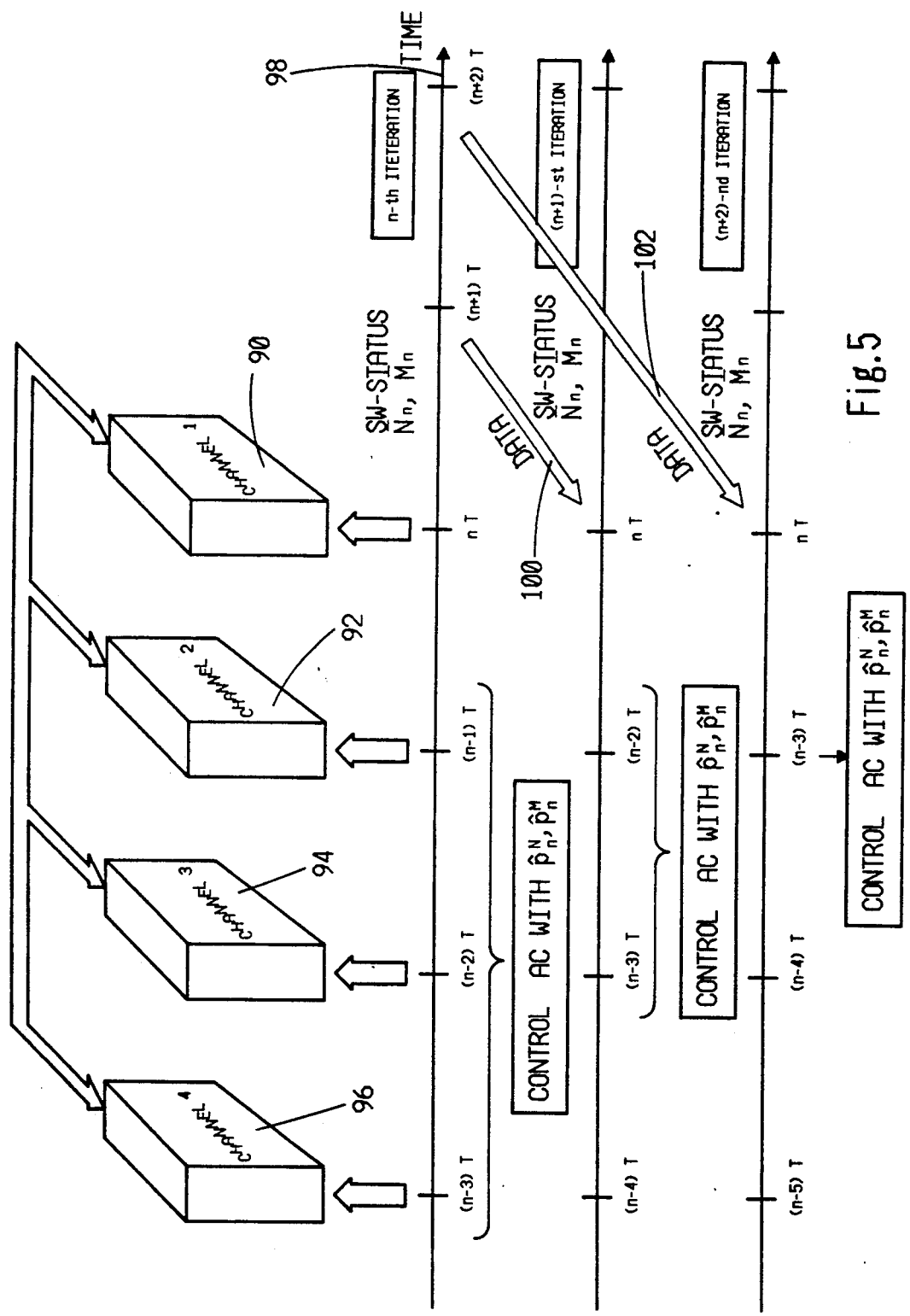
FIG. 5 illustrates the reconfiguration of the device, if software faults in the main program and in the monitoring program have been detected.

If both programs fail simultaneously and consequently a fault signal appears at the output 88, then a reconfiguration takes place, as illustrated in FIG. 5.

In FIG. 5 the four channels with one sensor module and one computer each are designated by 90, 92, 94 and 96. A time axis 98 with the discrete times $(n-1)T$, $(n-2)T$, $(n-1)T$, $nT$, $(n+1)T$, $(n+2)T$, etc., is illustrated below the channels. Each channel 90 to 96 processes, in the n-th computing cycle, the sensor signals of a time which is marked on the time axis 98 below the respective channel. It can be imagined, that in normal operation the time axis 98 moves from the right to the left below and relative to the channels 90, 92, 94 and 96. In the (n+1)-th computing cycle, the computer in channel 90 processes the sensor signals which are sampled synchronously therewith in the (n+1)-th sampling cycle, thus also at the time $(n+1)T$. In the (n+1)-th computing cycle, the computer in the second channel 92 processes the sensor signals from the n-th sampling cycle, which have been processed by the first channel before, etc. This situation is not changed, if a single program exhibits a software fault. Then the signal processing is effected in the same way by the remaining program.

If, however, both programs exhibit a software fault in the n-th computing cycle, thus at the time nT, then the procedure in the next, (n+1)-th computing cycle, i.e. at the time $(n+1)T$ will be as illustrated in the second line of FIG. 5.

During the n-th computing cycle, in which the fault in the software $N_n$ and $M_n$ is detected, the software in the channels 92, 94 and 96 is still operative. Therefore, a predicted value can be formed from the output data of the three computers 36, 38 and 40. This predicted value is a good approximation of the value $p_n^N$ or $p_n^M$.

In the (n+1)-th computing cycle, this predicted value $\hat{p}_n^N$ or $\hat{p}_n^M$ is used. It is assumed that during the short cycle interval T the "correct" output data have not yet changed inadmissibly. During this cycle interval the computers 36, 38 and 40 do not receive any new sensor signals. Otherwise the computers 36, 38 and 40 would, one after the other, all receive the critical data set which resulted in the software fault of the first computer. Instead, the first computer receives the sensor signals from the (n+1)-th sampling cycle, i.e. from time $(n+1)T$. This is illustrated by the arrow 100 in FIG. 5. It can happen that the first computer will then begin to work properly again. The critical data set is no longer applied to the computer 34. Then the four channels 90, 92, 94 and 96 will be reset to normal operation for the next computing cycle. If, however, the computer 34 remains in its defective state, then the predicted value last computed from unobjectionable output data continues to be used for the flight control in the next, (n+2)-th computing cycle. The first computer 34 again receives the new sensor signals, which now had been sampled at the time $(n+2)T$. This is illustrated by arrow 102 in FIG. 5. Again the fault logic tests whether the programs N and/or M work properly again with the new data sets. This may happen. If this happens, there will be change over to normal operation in the next computing cycle. If, however, after this period of time (or a time interval admissible for the respective use) unobjectionable operation of the software has not yet been restored, then inoperativeness of the device has to be signalled.

Two programs suffice for the device described. These programs need not necessarily be written by different programmers in different programming languages, as no redundancy "in space" in different, differently programmed computers is utilized but a redundancy "in time". It is assumed that latent program faults occurring only with certain constellations of input data will not occur both in the computing cycle n and in the computing cycles (n−3), (n−2) and (n−1), and that the physical quantities do not change so quickly that the quantity from computing cycle (n−1) could not be used instead of the quantity from computing cycle n.

I claim:

1. A device for generating measuring signals with a plurality of redundantly provided sensors, the sensors providing sensor signals which are sampled and digitized at a predetermined cycle rate and are processed by a plurality computers, which are also redundantly provided and operated with multiply provided software, comprising:
   (a) each of the computers (34, 36, 38, 40) processes the sensor signals with a main program (N) and, in parallel thereto, with a monitoring program (M) different from the main program (N),
   (b) a first one of said computers (34) is arranged to process, in each computing cycle (n), sensor signals which have been sampled in a predetermined sampling cycle (n) referenced to said computing cycle(n),
   (c) further ones of said computers (36, 38, 40) are arranged to process, in each computing cycle (n), sensor signals which have been sampled in preceding sampling cycles ((n−1), (n−2), (n−3)) which have different lead times relative to said predetermined sampling cycle, and
   (d) a fault logic (FIG. 2) is provided to make decisions on program faults based on results obtained from the computer processing with the main program (N) and the monitoring program (M) in each of the various computing cycles.

2. The device as claimed in claim 1, further comprising the fault logic
   being adapted to form the difference ($\Delta p_n$) of the results from the processing of the output data ($p_n^N$; $p_n^M$) obtained from the first computer (34) with the main program (N) and with the monitoring program (M), and, if a significant difference occurs,
   to compare the output data obtained from the first computer with the main program (N) and with the monitoring program (M) with predicted values ($\hat{p}_n^N$; $\hat{p}_n^M$), which have been formed from the output data obtained with the main program (N) and the monitoring program (M) in the sampling cycles ((n−1), (n−2), (n−3)).

3. The device as claimed in claim 1, further comprising four computers (34, 36, 38, 40) provided, a first computer (34) of which is arranged to process sensor signals from said predetermined sampling cycle (n), a second computer (36) of which is arranged to process sensor signals from the first preceding sampling cycle (n−1), a third computer (38) of which is arranged to process signals from the second preceding sampling cycle (n−2), and a fourth computer (40) of which is arranged to process sensor signals from the third sampling cycle (n−3).

4. The device as claimed in claim 3, further comprising
   (a) said first computer (34) arranged to provide first output data ($p_n^N$) with said main program (N) from the sensor signals sampled in said predetermined sampling cycle (n),
   (b) said first computer (34) arranged to provide second output data ($p_n^M$) with said monitoring program (M) from the sensor signals sampled in said predetermined sampling cycle (n).
   (c) said fault logic arranged to form the difference ($\Delta p_n$) of said first and second output data, and
   (d) said fault logic further arranged, when said first and second output data differ significantly, to activate a computer (60) means for computing predicted values ($\hat{p}_n^N$; $\hat{p}_n^M$) and a fault logic (68,70) responding to a deviation of said output data from said predicted values.

5. The device as claimed in claim 4, further comprising said computer means (60) for computing predicted values:
   (a) receiving the output data ($p_{n-3}$, $p_{n-2}$, $p_{n-1}$) sampled in the leading computing cycles ((n−3), (n−2), (n−1)), and
   (b) are adapted to generate therefrom predicted values in accordance with the following relations:

$$p_n^N = K(p_{n-1}^N - p_{n-2}^N) + p_{n-3}^N$$

$$p_n^M = K(p_{n-1}^M - p_{n-2}^M) + p_{n-3}^M$$

wherein "p" designate output data of the sensor signal processing, the upper index designates the program used to obtain the output data (N=main program, M=monitoring program), and the lower index designates the current number of the sampling cycle in which the sensor signals used to form the output data were sampled.

6. The device as claimed in claim 5, wherein the fault logic comprises:
   (a) means (68) for forming all possible differences of output data from said first computer (34) and predicted values, and
   (b) a decision logic (70) to which the difference of the two output data provided by said first computer (34) by means of said main program (N) and said monitoring program (M) and the differences between these output data and said predicted values are applied, said decision logic (70) determining fault status of the programs from these differences.

7. The device as claimed in claim 6, wherein said decision logic provides the following truth table:

| $\Delta p_n$ | $p^{NN}$ | $p^{NM}$ | $p^{MN}$ | $p^{MM}$ | Output States | | |
|---|---|---|---|---|---|---|---|
| | | | | | $N_n$ | $M_n$ | Failure |
| 0 | 0 | 0 | 0 | 0 | 1 | 1 | 0 |
| 1 | 1 | 1 | 0 | 0 | 0 | 1 | 0 |
| 1 | 0 | 0 | 1 | 1 | 1 | 0 | 0 |
| 1 | 1 | 1 | 1 | 1 | 0 | 0 | 1 |
| all other possibles states | | | | | 0 | 0 | 1 | wherein 1=valid, 0=invalid.

8. The device as claimed in claim 3, and further comprising reconfigurating means for
   controlling said first computer (34), when a fault of said main program or of said monitoring program is detected, to continue to operate with the respective other of said main or monitoring program, interrupting the input of further data into said further computers (36, 38, 40) during a plurality of computing cycles, when the main program (N) and the monitoring program (M) fail simultaneously, applying to an output predicted values determined during the last computing cycle (n−1) preceding the fault, continuing to apply further sampled and digitized sensor signals to said first computer (34), and causing a fault message, if after a predetermined number of sampling and computing cycles the output data obtained with the main program (n) and the monitoring program (M) are not yet in conformity with each other and with the predicted values.

9. The device as claimed in claim 1, further comprising a control signal dependent on said sensor signals and applied to components is formed from said output data of said further ones of said computers (36, 38, 40).

* * * * *